| United States Patent [19] | [11] Patent Number: 4,918,037 |
| --- | --- |
| Seppänen | [45] Date of Patent: Apr. 17, 1990 |

[54] CATALYST COMPONENTS FOR POLYMERIZATION CATALYST OF OLEFINS AND METHOD FOR THE PRODUCTION THEREOF

[75] Inventor: Hanneli Seppänen, Helsinki, Finland

[73] Assignee: Neste Oy, Finland

[21] Appl. No.: 320,460

[22] Filed: Mar. 8, 1989

Related U.S. Application Data

[63] Continuation of Ser. No. 102,136, Sep. 29, 1987, abandoned.

[30] Foreign Application Priority Data

Sep. 29, 1986 [FI] Finland ................... 863930

[51] Int. Cl.$^4$ ................... C08F 4/64
[52] U.S. Cl. ................... 502/107; 502/111; 502/119; 502/120; 502/125; 502/127; 502/133; 502/134; 526/125
[58] Field of Search ............... 502/111, 119, 120, 125, 502/127, 133, 134, 107

[56] References Cited

U.S. PATENT DOCUMENTS

| 4,301,029 | 11/1981 | Caunt et al. | 502/127 X |
| 4,397,762 | 8/1983 | Johnstone | 502/120 X |
| 4,468,477 | 8/1984 | Caunt et al. | 502/133 X |
| 4,673,661 | 6/1987 | Lofgren et al. | 502/111 |
| 4,814,309 | 3/1989 | Seppanen | 502/107 |

Primary Examiner—Patrick P. Garvin
Attorney, Agent, or Firm—Steinberg & Raskin

[57] ABSTRACT

A catalyst component for polymerization catalyst of α-olefines, the polymerization catalyst comprising an organoaluminum compound, an electron donor, as well as the solid catalyst component which is obtained when a compound containing magnesium reacts with a titanium halogen compound. A method for producing the catalyst component is also provided. The catalyst component is manufactured by reacting with a titanium halogen compound in the presence of an internal electron donor, a solid catalyst component which has been produced by the steps of (a) reacting a magnesium alkyl compound with a chlorinating compound,
(b) dissolving the chlorinated magnesium alkyl compound in alcohol, after possible washing,
(c) adding into the solution, magnesium silicate which has not been calcinated,
(d) adding the mixture obtained in step (c) into a cold medium, to precipitate the magnesium compound into and onto the magnesium silicate carrier, and
(e) separating the thus-obtained solid carrier component.

21 Claims, No Drawings

CATALYST COMPONENTS FOR POLYMERIZATION CATALYST OF OLEFINS AND METHOD FOR THE PRODUCTION THEREOF

This is a continuation of application Ser. No. 102,136, filed Sept. 29, 1987 and now abandoned.

BACKGROUND OF THE INVENTION

The present invention concerns a catalyst component for polymerization catalysts of α-olefines, such catalysts comprising an organoaluminum compound, an electron donor, and a solid catalyst component. More particularly, the solid catalyst component is obtained when a component or compound containing magnesium reacts with a titanium halogen compound. The present invention also concerns a method for producing these catalyst components as well as a method for polymerizing α-olefines, especially propylene, utilizing these thus-produced catalyst components.

High-activity catalysts which are produced from an aluminum alkyl compound, an electron donor, and a halogenated titanium compound on a solid carrier containing various magnesium compounds, are known for polymerizing α-olefines. The most commonly used magnesium compound is anhydrous magnesium chloride, either alone or together with other magnesium compounds, or organic magnesium compound manufactured by halogenating organic magnesium compounds with compounds containing chlorine. The magnesium compound may also be included in the solid carrier component for which silica is most commonly used.

In these types of polymerization catalysts, the properties of the solid carrier component have significant influence upon the properties of the final catalyst, e.g. on the activity thereof. These properties can be essentially influenced by the method of producing the carrier components.

It has been noted in the present invention, that when polymerizing α-olefines, especially propylene, it is possible to obtain considerably better yields and isotactic values, if magnesium silicate which has not been calcinated in advance by a heating treatment, is used as the solid carrier component.

The use of magnesium silicate in Ziegler-Natta catalysts, is known in and of itself. Thus, for example, according to the method presented in British patent publication No. 2,082,602, magnesium alkyl is dissolved or suspended into an inert hydrocarbon solvent, with magnesium silicate being added, after which the obtained solid catalyst compound is washed and treated with titanium tetrachloride. The thus-produced catalyst is used in the homopolymerization and copolymerization of ethylene.

In the method presented in DE patent publication No. 3,011,326, magnesium halide, e.g. magnesium chloride, is dissolved in ethanol, with magnesium silicate treated with a chlorinating agent being added into the produced solution. The magnesium halide is precipitated by adding the mixture into a hydrocarbon solvent, e.g. heptane, with the thus-obtained component being treated with titanium tetrachloride. The thus-produced catalyst has been also applied in the Polymerization of propylene, however the isotactic value obtained for the polymer in this method ranges between 92-93%.

SUMMARY OF THE INVENTION

Accordingly, it is an object of the present invention to improve the polymerizing of α-olefines, especially propylene.

It is a mure specific object of the present to improve yield and isotactic value in the polymerizing of the α-olefines.

It is also an object of the present invention to provide a new and improved catalyst for the polymerizing of α-olefines, notably propylene.

It is an additional object of the present invention to provide a new and improved catalyst or carrier component for effecting polymerizing of the α-olefines.

These and other objects are attained by the present invention which is directed to a catalyst component for polymerizing α-olefines. The catalyst component is prepared by the steps of (a) reacting a magnesium alkyl compound with a chlorinating compound, (b) dissolving the thus-formed chlorinated magnesium alkyl compound in alcohol, (c) adding magnesium silicate which has not been calcinated, to the thus-formed solution, (d) adding the resulting mixture obtained in step (c) into a cold medium, thereby precipitating the chlorinated magnesium alkyl compound into and onto the magnesium silicate, and (e) separating the obtained solid catalyst component. The present invention is also directed to a method for producing a catalyst component for polymerizing α-olefines, comprising steps (a)-(e) listed above.

The catalyst provided by the present invention is applied in manufacturing stereospecific polymers, especially polypropylene, so that the polymerizing yield and the isotactic value are high, as compared to catalysts prepared by previously-known technology. In particular, the catalyst component of the present invention is manufactured by reacting with a titanium halogen compound in the presence of an internal electron donor, a solid catalyst component which has been produced by the steps of (a) reacting a magnesium alkyl compound with a chlorinating compound, (b) dissolving the chlorinated magnesium alkyl compound in alcohol after optional washing, (c) adding magnesium silicate which has not been calcinated, into the solution, (d) adding the mixture obtained in step (c) into a cold medium, to precipitate the magnesium compound into and onto the magnesium silicate carrier, and (e) separating the thus-obtained solid carrier component.

The present invention also concerns a method for producing catalyst: components for such polymerization catalysts of α-olefines which comprise an organoaluminum compound, an external electron donor, and a solid magnesium-containing catalyst component which has been produced when a solid carrier component containing magensium reacts with a titanium halogen compound. The method of the present invention for producing the catalyst component, comprises the steps of (a) reacting a magnesium alkyl compound with a chlorinating compound, (b) dissolving the chlorinated magnesium compound in alcohol (after possible washing), (c) adding magnesium silicate which has not been calcinated, into the solution produced in step (b), (d) adding the mixture obtained in step (c) into a cold medium, to precipitate the magnesium compound into and onto the magnesium silicate carrier, (e) separating the obtained solid carrier component, and (f) reacting the solid carrier component separated in step (e) with a titanium halogen compound in the present of an internal electron donor.

DESCRIPTION OF THE PREFERRED EMBODIMENTS

The magnesium silicate used in step (c) when producing the catalyst component of the Present invention, is preferably a well-mixed mixture of silica and magnesium oxide, or a coprecipitate of silica and magnesium oxide. The manufacture of a coprecipitated silicon magnesium oxide (magnesium silicate) is well-known in the field. Coprecipitations of silica and magnesium oxide are commercially available. Silica and magnesium oxide can be effectively mixed by, e.g., grinding a mixture of these two oxides in a ball mill.

Another method for preparing a suitable magnesium silicate, is heating up of a mixture containing particles of silica or alkali metal silicate and a magnesium compound. When heated, these ingredients precipitate into magnesium silicate. Examples of magnesium compounds which can be heated up in this manner with silica or alkali metal silicate, include magnesium alkoxides, magnesium hydroxide, magnesium carbonate, magnesium sulfate, magnesium chloride, and magnesium nitrate. In the present invention, magnesium silicate precipitated from magnesium sulfate or magnesium chloride and sodium silicate, is preferably used as a carrier.

All reactants must be dry and treated with nitrogen (moisture and oxygen content <10 ppm) when preparing a carrier component according to the present invention.

The magnesium alkyl compound used as a reactant in the catalyst component of the present invention, is usually in the form of $MgR'_2$ or $MgR'R''$ where $R'$ and $R''$ are either the same or different and contain alkyls from $C_1$ to $C_{20}$, preferably $C_2-C_{12}$. The magnesium compound can be, for example, diethyl magnesium, ethyl-butyl magnesium, ethyl-hexyl magnesium, ethyl-octyl magnesium, dibutyl magnesium, butyl-hexyl magnesium, butyl-octyl magnesium, dihexyl magnesium, hexyl-octyl magnesium, dioctyl magnesium, etc. The most preferred of these magnesium alkyl compounds, is butyl-octyl magnesium.

The chlorinating agent may be selected from the group consisting of chlorine, hydrogen chloride, alkyl chloride (e.g. butyl-chloride), $TiCl_4$, and mixtures thereof. The chlorination can be performed at a temperature of about $-10°$ to $100°$ C., preferably at about $10°-60°$ C. After the chlorination, the reaction mixture can be treated with nitrogen for about 15–60 minutes to ensure complete chlorination.

The chlorinated magnesium alkyl compound can be treated with a small amount of alcohol, but even without the alcohol treatment the finished catalyst may prove highly active. The alcohol may be either allphatic or aromatic, and may contain one or several hydroxyl groups such as, e.g., methanol, ethanol, 2-ethyl hexanol. If the alcohol treatment is performed, the precipitate can be washed several times with a hydrocarbon solvent, and the surplus solvent evaporated off by means of a nitrogen flow. After this step, the precipitate is dissolved in ethanol and the magnesium silicate carrier is added to this solution. The carrier is allowed to impregnate in this solution at a temperature of about $60°-70°$ C. Normally, a treatment time of about 3–24 hours is sufficient.

The magnesium silicate carrier with its impregnation solution is siphoned into a cold (under about $0°$ C.) hydrocarbon solvent, in which the magnesium compound of the solution immediately precipitates into the pores and on the surface of the magnesium silicate carrier. The solvent temperature may vary between about $-30°$ to $-5°$ C. The obtained carrier component is washed several times with a hydrocarbon solvent. After the washing, the carrier component is treated with titanium tetrachloride by a method known in and of itself, in order to further produce a catalyst component.

The titanium treatment may take place, e.g. in a manner such that the solid carrier component is allowed to react with titanium tetrachloride either once or several times. The catalyst component may be additionally treated by means of an internal electron donor compound before, during, or after the titanium treatment. Titanium treatment should preferably take place in two stages so that in the first stage, an internal electron donor compound, usually of the amine, ether, or ester type, is added. A suitable donor, is, e.g., di-isobutyl phthalate.

In the first stage, a low temperature e.g. under about $0°$ C., preferably under about $-20°$ C., is recommendably used. The temperature is raised during the titanium treatment to about $90°-110°$ C. The second titanium treatment is performed at a temperature of about $90°-100°$ C. for about 1–2 hours. The solid reaction product is separated from the liquid phase and washed with hydrocarbon solvent to remove impurities and derivatives. The catalyst component is dried with nitrogen gas at room temperature or at slightly higher temperature.

The catalyst component introduced by the present invention can be used to polymerize α-olefines by allowing the catalyst component to come into contact with an Al-compound and an external electron donor. Amines, ethers, esters (preferably alkyl or aryl esters of aromatic carboxyl acids) or silane compounds (aryl/alkyl silanes) such as methyl or ethyl esters of benzoic acid, toluene acid and phthalic acid, isobutyl esters of phthalic acid, triethoxy silane, etc., can be used, among others, as the external electron donor. The noted electron donors are compounds that are capable of forming complexes with Al-alkyls. These can be used to improve the stereospecific properties of the catalyst. The external electron donor and the Al-alkyl are mixed together with a molar ratio of electron donor and Al-alkyl being about 10–30, and the Al/Ti molar ratio is about 5–300 depending on the polymerization system.

The polymerization can be carried out either as slurry, bulk, or gas phase polymerization. Catalyst components and catalysts produced according to the present invention can be used in the polymerizing of α-olefines such as propylene, by slurry, bulk or gas phase methods.

The present invention will be further described by way of the following demonstrative examples:

EXAMPLES 1-9

60 ml. of magnesium alkyl (butyl-octyl magnesium as a 20% heptane solution) and heptane were measured into a five-necked flask which was provided with a mechanical stirrer, a reflux condenser, a gas supply valve and a thermometer. The suspension was treated with nitrogen and maintained under inert conditions throughout the manufacturing process. The mixture was then chlorinated with chlorine gas at a rate of 0.25 l/min. for 10-25 min.

After this, the mixture was treated with nitrogen for 30 min., and then heated up to 94°-98° C., with 20 ml. of ethanol being added, upon which the chlorinated precipitate thickened. The precipitate was twice washed with 250 ml of heptane, with excess solvent being evaporated by means of nitrogen flow after the washings. The precipitate was dissolved into ethanol at 80° C., with magnesium silicate that had not been calcinated being added to the solution.

The mixture was mixed at 70° C. overnight. The hot mixture was siphoned into cold (−20° C.) heptane, upon which the dissolved magnesium component precipitated into the pores and onto the surface of the magnesium silicate. The solid component was twice washed with heptane at room temperature, and was then cooled down to −25° C., with titanium tetrachloride being added at this temperature. After this, the temperature of the mixture was allowed to rise to room temperature, at which temperature di-isobutyl phthalate was added. The temperature was raised to 100°-110° C., and the mixture was stirred for 60 min.

After the precipitate had sedimented, the solution was removed by siphoning. The titanium tetrachloride treatment was repeated at 100°-110° C. for 60 min.

After the precipitate sedimented and the solution had been siphoned, the finished catalyst component was washed several times (5-6 times at a temperature of 80° C.) with heptane, and dried in a nitrogen flow.

EXAMPLE 10

The catalyst was produced as in Examples 1-9, however the first alcohol treatment with ethanol was left out, with the washing stage after this ethanol treatment also being omitted.

Table 1 lists the amount of reagents and solvents utilized in each of Examples 1-10.

The catalyst components produced in the above-described method were used in the polymerization of propylene by adding into a 2 l. polymerization reactor, a catalyst that had been prepared by mixing triethyl aluminum as aluminum alkyl and diphenyl dimethoxy silane as an external donor compound (Al/donor molar ratio 20) with 50 ml. of heptane, after five minutes, adding a catalyst component into this mixture so that the Al/Ti molar ratio was 200. The polymerization was performed under the following conditions: propylene partial pressure 9.0 bar, hydrogen partial pressure 0.3 bar, temperature 70° C. and polymerization time 3 h.

Ethylene was also polymerized with a catalyst utilizing the component of Example 9, in a manner such that a catalyst solution that had been prepared by using triethyl aluminum as the cocatalyst and a catalyst component so that the Al/Ti molar ratio was 5, was fed into a reactor that had been treated with nitrogen. The partial pressure of hydrogen bomb was adjusted to 7 bar. Ethylene was fed through so that the reactor total pressure was 15 bar. Polymerization temperature was 90° C. and Polymerization time 1 h.

1-butene was also polymerized with a catalyst utilizing a component prepared according to Example 8, in a manner such that a catalyst solution that had been prepared by using tri-isobutyl aluminum as the cocatalyst and diphenyl dimethoxysilane as the external donor compound was fed into the reactor that had been treated with nitrogen. After this, isobutane (300 g) serving as a medium was added into the reactor, as well as 1-butene (300 g) and the catalyst component of Example 8. Polymerization conditions were as follows: 1-butene partial pressure 0.1 bar, temperature 28° C. and polymerization time 4 h.

The polymerization results and the properties of the polymers are reported in Table 2. The catalyst activity is indicted with the value g of polymer/g of catalyst. The polymer isotacticity has been determined by means of a heptane extraction. Melt flow index (MFI) is determined according to standard ASTM D 1238 and bulk density according to standard ASTM D 1895-69.

COMPARATIVE EXAMPLE 1

The catalyst component was produced as in Example 9, however the magnesium silicate carrier of which 5.4 g was used, was calcinated before use by heating up for two hours at 600° C., and then cooling down under nitrogen. In connection with the first titanium treatment, 3 ml. of di-isobutyl phthalate was added as an internal electron donor compound. The polymerization activity of this catalyst was found to be 3.8 g PP/g cat. 3 h. The polymer isotacticity was 96.0% and bulk density 0.23 g/ml.

COMPARATIVE EXAMPLE 2

The catalyst component was produced as in Comparative Example 1, however the magnesium silicate used had been calcinated by heating up for 4 hours at 400° C. The catalyst polymerization activity was found to he 4.4 kg PP/g cat. 3 h. The polymer isotacticity was 96.4%, bulk density 0.25 g/ml and MFI 15.50 g/10 min/230° C./2.16 kg.

COMPARATIVE EXAMPLE 3

The catalyst component was produced as in Comparative Example 1, however the magnesium silicate used was calcinated by heating up at 200° C. for 4 hours and cooling down under nitrogen. The catalyst polymerization activity was found to be 5.6 kg PP/g cat. 3 h. The polymer isotacticity was found to be 96.3% and bulk density 0.23 g/ml, with MFI 16.53 g/10 min./230° C./2.16 kg.

The preceding description of the present invention is merely exemplary, and is not intended to limit the scope thereof in any way.

TABLE 1

| Example | Carrier g | $R_2Mg$ ml | Heptane ml | Chlorination T/°C. | Chlorination t/min. | Alcohol ml | $TiCl_4$ ml | $TiCl_4$ T/°C. | $TiCl_4$ t/min. | Donor ml |
|---|---|---|---|---|---|---|---|---|---|---|
| 1 | 6.29 | 12 | 120 | 10-44 | 22 | 20 | 200 | −20-110 | 60 | 3 |
|  |  |  |  |  |  | 45 | 200 | 110 | 60 |  |

TABLE 1-continued

| | | | | Production of catalysts | | | | | | |
|---|---|---|---|---|---|---|---|---|---|---|
| | Carrier | R$_2$Mg | Heptane | Chlorination | | Alcohol | TiCl$_4$ | | | Donor |
| Example | g | ml | ml | T/°C. | t/min. | ml | ml | T/°C. | t/min. | ml |
| 2[1] | 5.13 | 12 | 100 | 10-56 | 24 | 20 | 200 | -20-110 | 60 | 3 |
| | | | | | | 45 | 200 | 110 | 60 | |
| 3 | 5.39 | 8 | 140 | 13-56 | 40 | 14 | 200 | -20-110 | 60 | 3 |
| | | | | | | 45 | 200 | 110 | 60 | |
| 4[2] | 5.44 | 12 | 100 | 18-60 | 28 | 20 | 200 | -20-110 | 60 | 3 |
| | | | | | | 45 | 200 | 110 | 60 | |
| 5 | 5.05 | 12 | 100 | <0 | 80 | 20 | 200 | -20-110 | 60 | 3 |
| | | | | | | 45 | 200 | 110 | 60 | |
| 6 | 5.17 | 12 | 100 | 10-57 | 22 | 20 | 200 | <-10 | 120 | 3 |
| | | | | | | 45 | 200 | 110 | 60 | |
| 7 | 4.99 | 12 | 100 | 10-54 | 24 | 20 | 200 | <-10 | 240 | 3 |
| | | | | | | 45 | 200 | 110 | 60 | |
| 8 | 5.62 | 12 | 100 | 16-60 | 24 | 20 | 200 | +20-110 | 60 | 3 |
| | | | | | | 45 | 200 | 110 | 60 | |
| 9[3] | 2.00 | 12 | 60 | 10-40 | 15 | 20 | 200 | -20-110 | 60 | — |
| | | | | | | 50 | 200 | 110 | 60 | |
| 10 | 4.79 | 24 | 60 | 10-65 | 45 | 45 | 200 | -20-110 | 60 | 3 |
| | | | | | | | 200 | 110 | 60 | |

[1] before the titanium treatment the surface layer and the bottom layer are separated from each other; further treatment is performed on the bottom layer
[2] after the carrier has been added, the mixture is mixed for 3 hours
[3] no donor

TABLE 2

Catalyst's polymerization activity and polymer's properties

| Example | Activity g polym./g cat. 3h | | Isotacticity % | MFI 230° C. 2.16 kg 10 min. | Bulk density |
|---|---|---|---|---|---|
| 1 | 4.2 | (PP) | 96.6 | 16.40 | 0.23 |
| 2 | 2.1 | (PP) | 98.8 | 19.79 | 0.27 |
| 3 | 2.6 | (PP) | 97.4 | 13.84 | 0.23 |
| 4 | 3.6 | (PP) | 97.7 | 12.07 | 0.31 |
| 5 | 3.1 | (PP) | 98.4 | 25.60 | 0.24 |
| 6 | 4.7 | (PP) | 97.4 | 11.97 | 0.21 |
| 7 | 2.4 | (PP) | 98.0 | 18.91 | 0.24 |
| 8 | 5.4 | (PP) | 98.4 | 18.96 | 0.37 |
| | 0.3 | (poly-1-butene) | 96.1 | — | 0.23 |
| 9 | 3.7 | (PP) | 86.4 | — | 0.21 |
| | 1.3 | (PE) | | 13.62 (21.6 kg) | 0.36 |
| 10 | 9.3 | | 93.0 | 4.14 | 0.38 |

I claim:

1. Catalyst component for polymerizing α-olefins, said catalyst component prepared by the steps of
   (a) reacting a magnesium alkyl compound with chlorine gas,
   (b) dissolving the thus-formed chlorinated magnesium alkyl compound in alcohol,
   (c) adding magnesium silicate which has not been calcinated, to the thus-formed solution,
   (d) adding the resulting mixture obtained in step (c) into a hydrocarbon medium, at a temperature under about 0∨ C., thereby precipitating the chlorinated magnesium alkyl compound into and onto the magnesium silicate,
   (e) separating the obtained solid catalyst component, and
   (f) reacting the obtained solid catalyst component from step (e), with a titanium halogen compound in the presence of an internal electron donor,
   whereby isotacticity of polypropylene polymerized in the presence of the thus-formed catalyst component is greater than isotacticity of propylene polymerized in the presence of a catalyst component formed with calcinated magnesium silicate.

2. The component of claim 1, prepared with the additional step of
   (a') washing the thus-formed chlorinated magnesium alkyl compound prior to step (b).

3. A catalyst for polymerizing α-olefines, prepared by the step of
   (g) contacting the component obtained in step (f) of claim 1, with an Al-compound and an external electron donor.

4. A method for producing a catalyst component for polymerizing α-olefines, comprising the steps of
   (a) reacting a magnesium alkyl compound with chlorine gas,
   (b) dissolving the thus-formed chlorinated magnesium alkyl compound in alcohol,
   (c) adding magnesium silicate which has not been calcinated, to the thus-formed solution,
   (d) adding the resulting mixture obtained in step (c) into a hydrocarbon medium at a temperature under about 0° C., thereby precipitating the chlorinated magnesium alkyl compound into and onto the magnesium silicate,
   (e) separating the obtained solid catalyst component, and
   (f) reacting the obtained solid catalyst component from step (e), with a titanium halogen compound in the presence of an internal electron donor,
   whereby isotacticity of propylene polymerized in the presence of the thus-formed catalyst component is greater than isotacticity of propylene polymerized in the presence of a catalyst component formed with calcinated magnesium silicate.

5. The method of claim 4, comprising the additional step of
   (a') washing the thus-formed chlorinated magnesium alkyl compound prior to step (b).

6. The method of claim 4, comprising the additional step of
   (g) contacting the component obtained in step (f), with an Al-compound and an external electron donor.

7. The method of claim 4, wherein the magnesium silicate added in step (c), is a mixture of silica and magnesium oxide or a coprecipitate of silica and magnesium oxide.

8. The method of claim 4, wherein the magnesium silicate added in step (c) is precipitated from magnesium sulfate or magnesium chloride and sodium silicate.

9. The method of claim 4, wherein the magnesium alkyl compound reacted in step (a) is butyl-octyl magnesium.

10. The method of claim 4, comprising the additional step of
   (a') adding to a precipitate formed in step (a) an amount of alcohol to thicken the precipitate and which is then washed out prior to step (b).

11. The method of claim 4, wherein step (f) is performed in two stages, with the internal electron donor being added in the first stage thereof.

12. The method of claim 4, wherein the internal electron donor present in step (f) is di-isobutyl phthalate.

13. The method of claim 11, wherein starting temperature in the first stage of step (f) is under about 0° C., and temperature in the second stage of step (f) is about 90°–110° C.

14. The method of claim 4, wherein step (a) is carried out at a temperature at about −10° to 100° C.

15. The method of claim 14, wherein the temperature in step (a) is about 10° to 60° C.

16. The method of claim 4, wherein step (c) is carried out at a temperature of about 60°–70° C.

17. The method of claim 4, wherein step (c) is carried out for about 3–24 hours.

18. The method of claim 4, wherein temperature of the cold medium in step (d) is about −30° to −5° C.

19. The catalyst of claim 1, wherein
   (a) the magnesium alkyl compound is reacted with the chlorine gas for about 10-25 minutes.

20. The method of claim 4, wherein
   (a) the magnesium alkyl compound is reacted with the chlorine gas for about 10-25 minutes.

21. The method of claim 15, comprising the additional step
   (a') after step (a) is completed, treating the resulting reaction mixture with nitrogen for about 15–60 minutes to ensure complete chlorination.

* * * * *